United States Patent
Nassar et al.

(10) Patent No.: US 11,032,134 B2
(45) Date of Patent: Jun. 8, 2021

(54) PROVIDING AND MANAGING AN ADAPTER AS A SERVICE (AAAS) BROKERING SERVICE

(71) Applicant: INTERNATIONAL BUSINESS MACHINES CORPORATION, Armonk, NY (US)

(72) Inventors: Nader Nassar, Yorktown Heights, NY (US); John Moore, Jr., Pflugerville, TX (US); Sudheer Kotilingala, Iselin, NJ (US); Weibo Yuan, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/444,706

(22) Filed: Jun. 18, 2019

(65) Prior Publication Data
US 2020/0403858 A1    Dec. 24, 2020

(51) Int. Cl.
*H04L 12/24* (2006.01)
*G06F 16/903* (2019.01)
*H04L 12/911* (2013.01)

(52) U.S. Cl.
CPC ........ *H04L 41/0806* (2013.01); *G06F 16/903* (2019.01); *H04L 47/782* (2013.01); *H04L 47/783* (2013.01)

(58) Field of Classification Search
None
See application file for complete search history.

(56) References Cited

U.S. PATENT DOCUMENTS

| | | | |
|---|---|---|---|
| 9,690,920 B2 | 6/2017 | Marcus et al. | |
| 9,854,060 B2* | 12/2017 | Deulgaonkar | H04L 67/32 |
| 2008/0114863 A1* | 5/2008 | Baskey | H04L 41/0886 709/222 |
| 2011/0145392 A1* | 6/2011 | Dawson | H04L 41/0813 709/224 |
| 2011/0231899 A1* | 9/2011 | Pulier | H04L 63/0272 726/1 |
| 2011/0314532 A1 | 12/2011 | Austin et al. | |

(Continued)

OTHER PUBLICATIONS

"Towards a Federated Identity as a Service Model," Zwattendorfer et al. E-Government Innovation Center (EGIZ), Graz University of Technology, Graz, Austria. Lecture Notes in Computer Science vol. 8061, 2013, pp. 43-57 URL: http://link.springer.com/chapter/10.1007%2F978-3-642-40160-2_5 The original publication is available at www.springerlink.com ( 15 Pages ).

(Continued)

*Primary Examiner* — Scott B Christensen
(74) *Attorney, Agent, or Firm* — Griffiths & Seaton PLLC

(57) ABSTRACT

Various embodiments are provided for managing an adapter as a service (AaaS) in a computing environment by a processor. Accesses to one or more of a plurality of identity and access management (IAM) systems may be provided via an adapter as a service (AaaS) functioning as an exchange service between one or more users and one or more providers of a plurality of types of adapters, wherein the plurality of types of adapters in the AaaS enable provisioning and de-provisioning to one or more of the plurality of IAM systems.

17 Claims, 7 Drawing Sheets

(56) References Cited

U.S. PATENT DOCUMENTS

| | | | |
|---|---|---|---|
| 2015/0066572 A1* | 3/2015 | McLaren | G06Q 10/06316 |
| | | | 705/7.26 |
| 2016/0142399 A1 | 5/2016 | Pace et al. | |
| 2018/0083835 A1* | 3/2018 | Cole | H04L 41/12 |
| 2019/0260754 A1* | 8/2019 | Hecht | H04L 63/102 |
| 2020/0074329 A1* | 3/2020 | Sturtivant | G06Q 10/00 |

OTHER PUBLICATIONS

"Identity and Access Management as Security-as-a-Service from Clouds," Deepak H. Sharma et al. 7th International Conference on Communication, Computing and Virtualization 2016. Procedia Computer Science 79 ( 2016 ) 170-174.

"Centralized Authorization Service (CAuthS) or Authorization as a Service (AuthaaS)—A Conceptual Architecture" Pranab Das and Abhinav Das. International Journal of Computer Applications (0975-8887) vol. 113—No. 18, Mar. 2015 ( 9 Pages ).

\* cited by examiner

PROVIDING AND MANAGING AN ADAPTER AS A SERVICE (AAAS) BROKERING SERVICE

BACKGROUND OF THE INVENTION

Field of the Invention

The present invention relates in general to computing systems, and more particularly to, various embodiments for providing and managing an adapter as a service ("AaaS") brokering service using a computing processor.

Description of the Related Art

In today's society, consumers, businesspersons, educators, and others use various computing systems in a variety of settings. Computer systems may include data storage systems, or disk storage systems, to process and store data. For example, many businesses, organizations, educational institutions, or governmental agencies need to share data with various constituents for a variety of business, educational, and/or governmental purposes while also ensuring access to the appropriate computing systems and resources is maintained.

As the technology field increases, it becomes even more critical for computing systems to provide a variety of conveniently accessible frameworks and technologies that ensure that the appropriate persons in an enterprise have the appropriate access to the computing system resources. It is of paramount importance that a user is enabled to accesses to various computing applications (e.g., Software as Service (SaaS), on-premises services, and servers, network and storage devices, etc). To achieve increased productivity and user experience, security, and compliance, provisioning of accesses needs to be automated and efficiently managed.

SUMMARY OF THE INVENTION

Various embodiments for managing an adapter as a service (AaaS) in a computing environment by a processor, are provided. In one embodiment, by way of example only, a method for managing an adapter as a service (AaaS) in a computing environment, again by a processor, is provided. Accesses to identity and access management (IAM) systems may be provided via an adapter as a service (AaaS) functioning as an exchange service between users and providers of various types of adapters. The various types of adapters in the AaaS enable provisioning and de-provisioning to one or more of the plurality of IAM systems.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
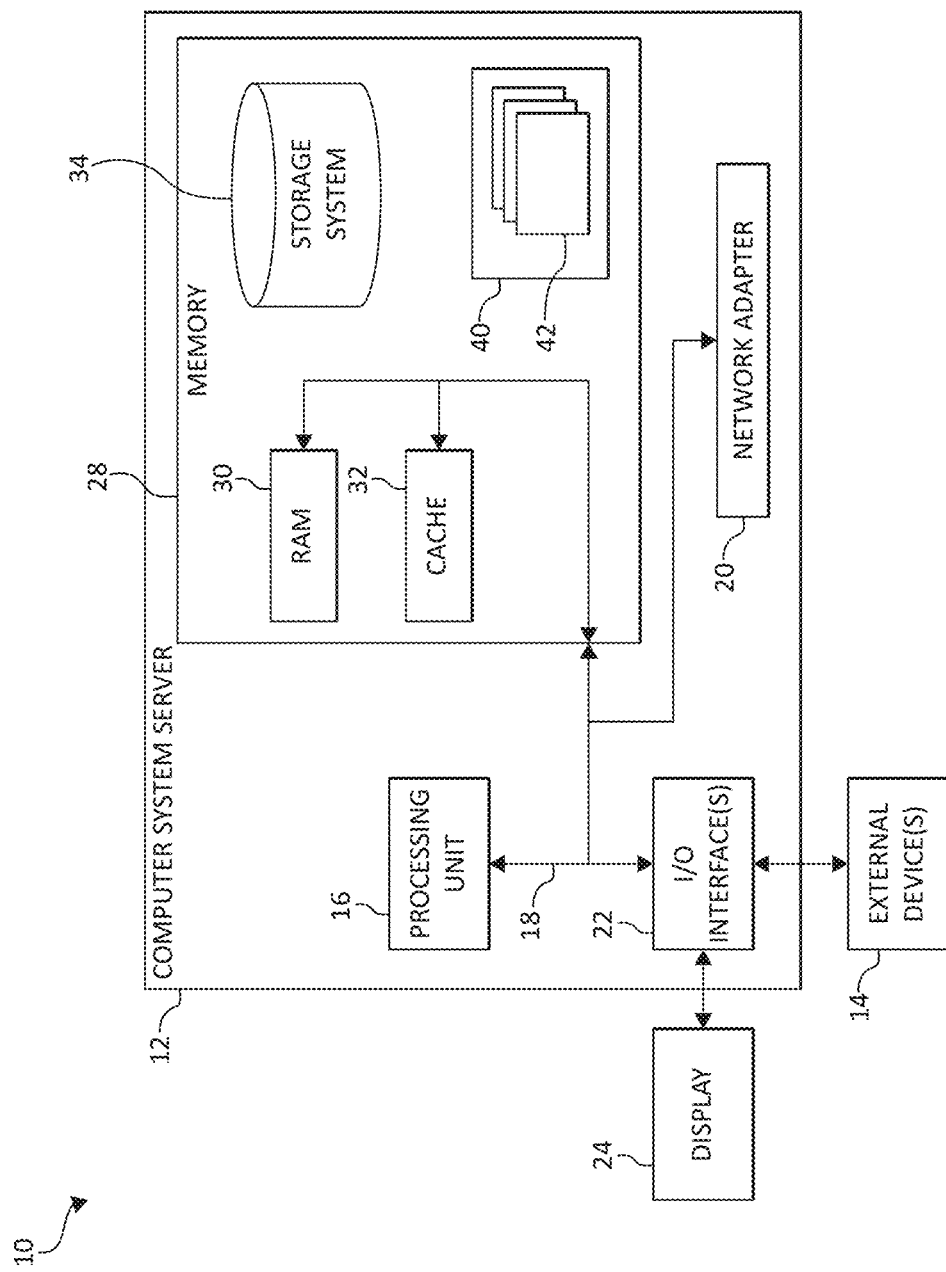
FIG. 1 is a block diagram depicting an exemplary cloud computing node according to an embodiment of the present invention.

As discussed above, various forms of computing systems may provide policies and frameworks for accessing various computing system. One such framework is Identity and Access Management ("IAM") governance. An IAM is a set of processes and policies for organizations to manage risks and maintain compliance with regulations and policies by administering, securing, and monitoring identities and their access to applications, information, and systems. An IAM systems, applications and platforms may manage identifying and ancillary data about entities that include individuals, computer-related hardware, and computing applications.

Although potentially complex in implementation, the concept of IAM Governance is fairly straightforward: determine who should have access to what resources and who should not, according to government regulations, industry-specific regulations, and business regulations and guidelines. Typically, key aspects of IAM Governance include access request governance, entitlement certifications, reports and audits, and analytics and intelligence (including role management, entitlement management, separation of duties enforcement, and privileged identity management). An end-to-end AM Governance solution may also provide related functions, such as access enforcement, user provisioning, password management, and user lifecycle management. IAM systems protect enterprise data and applications with context-based access control, security policy enforcement and business-driven driven identity governance. These systems may be operated in a standalone manner, in association with cloud-based environments, or in hybrid environments.

As a result, many enterprises implement their own solutions to govern the swarm of computer system entitlements. Thus, one challenge to both a user and vendor/provider is how to govern computing systems built on different technologies from a single platform. One such solution to this challenge is to build different adapters/connectors that bridge an IAM platform with a particular computing systems. Currently, IAM providers/vendors provide proprietary solutions that are customized to each individual client. However, such customization "locks" down the client to this single solution provided by the particular IAM provider/vendor. Thus, being locked into the adapters/connectors provided only by the IAM provider/vendor causes the switching of IAM providers to be extremely cost intensive and inefficient.

For example, each identify governance and administration ("IGA") offering of a provider/vendor may provide its own adapters or connectors to different types of applications and servers. While the industry/market leaders all have a list of adapters/connectors that cover the most common types of applications and infrastructure components, companies and users/customers as a whole suffer from the following deficiencies. First, there are always additional application or server types that the access provisioning product/offering vendor do not provide, and therefore customers need to develop custom adapters/connectors, which are costly and time-consuming to develop, maintain, and support. Second, developing a new adapter/connector for a new type of application or server is technically challenging. The means it provides are often different—Application Programming Interface (API), Command Line Interface (CLI), batch processing mechanisms, or even Robotic Process Automation via native administrative console. Third, adapters or connectors are propriety to vendors' offerings, cannot be shared across vendors, require deployment and hosting, and are not available in the form of "Adapter as a Service" feature as provided herein by the present invention. Each of these factors prevent users/entities from realizing quick time to value for their IGA investments, add significant cost, and negatively impact their return on investment (ROI).

Accordingly, various embodiments as described herein provide an IAM adapter/connector as a service (e.g., adapter as a service "AaaS") where multiple providers/vendors may provide one or more adapters/connectors that may be consumed by different users/vendors as a service. Moreover, the AaaS computing platform may enable users/clients that desire to govern their own IAM posture and to be provider/vendor agnostic to increases scalability, extensibility and fluidity needed for run an IAM operation.

In one aspect, mechanisms of the illustrated embodiments provide an Adapter as a Service (AaaS) (e.g., a Software as a Service (SaaS)) for IGA adapters or connectors. The AaaS provides one or more vendors a platform to monetize their adapter assets outside of their customer bases, and customers the benefits of consuming adapters from the AaaS marketplace. In this way, each vendor-provided adapter/connector is offered as a SaaS (e.g., the AaaS) without requiring a user/customer to develop, maintain, or support their own customized adapters. The AaaS may be consumed and/or used through a standardized system for cross identity provisioning RESTful application programming interfaces ("APIs"). In addition to its own adapter offerings, the AaaS also functions as an adapter exchange thereby allowing vendors to transact each adapter with a user/customer through the AaaS. One or more providers/vendors may enable access to each of their adapters capabilities by requiring a financial transaction to each entity that did not buy a vendors IGA offering. A pool of multiple provider/vendors adapter assets may be provided in a searchable and comprehensive list of adapters available in the AaaS. The AaaS may function as broker that provides a platform and engine that securely links providers/vendors of adapter services and users/customers of the adapters. The AaaS may serve as a gateway for transacting access or a subscription to an adapter/connector while also providing an entity support system ("ESS") to process and administer each transaction.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
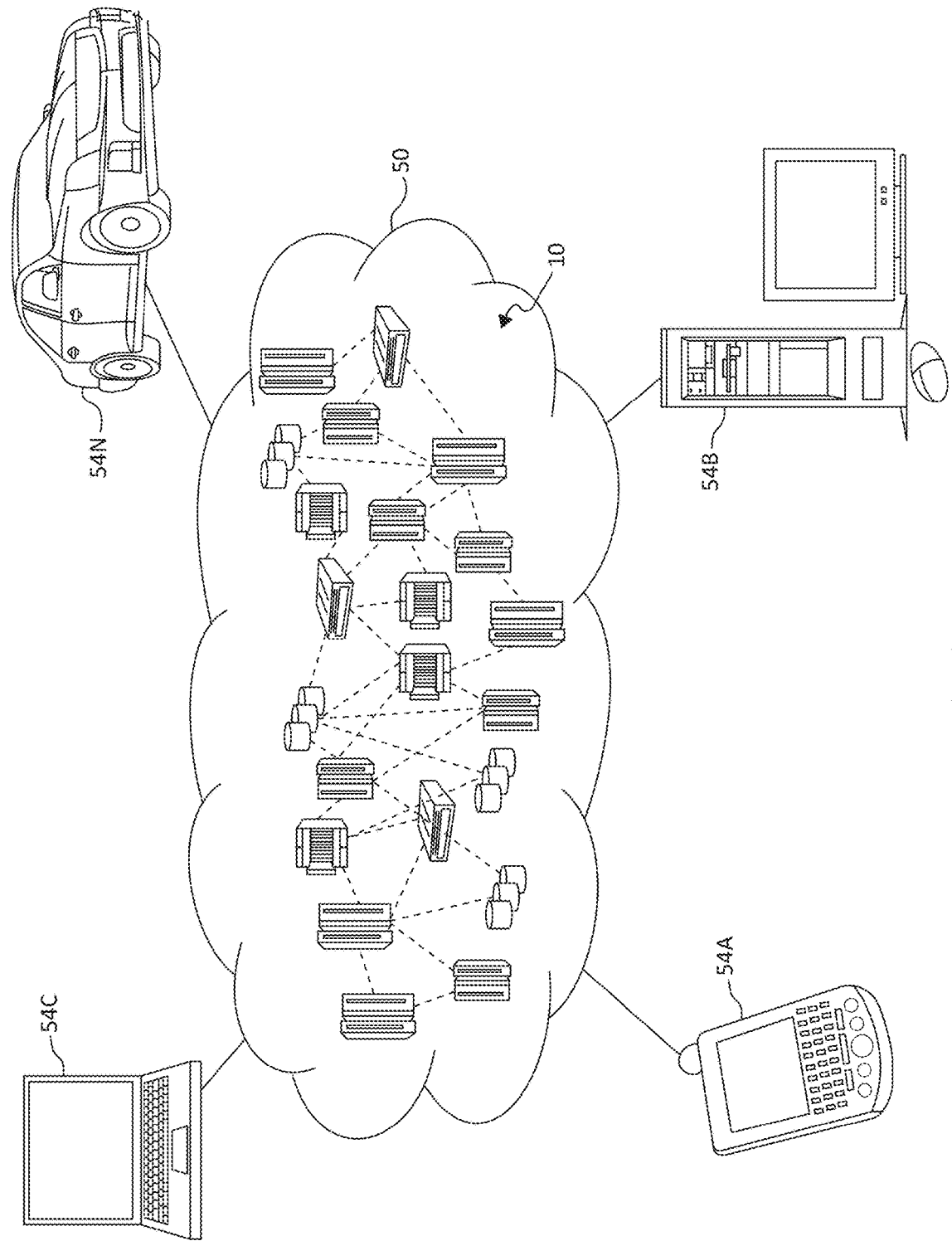
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
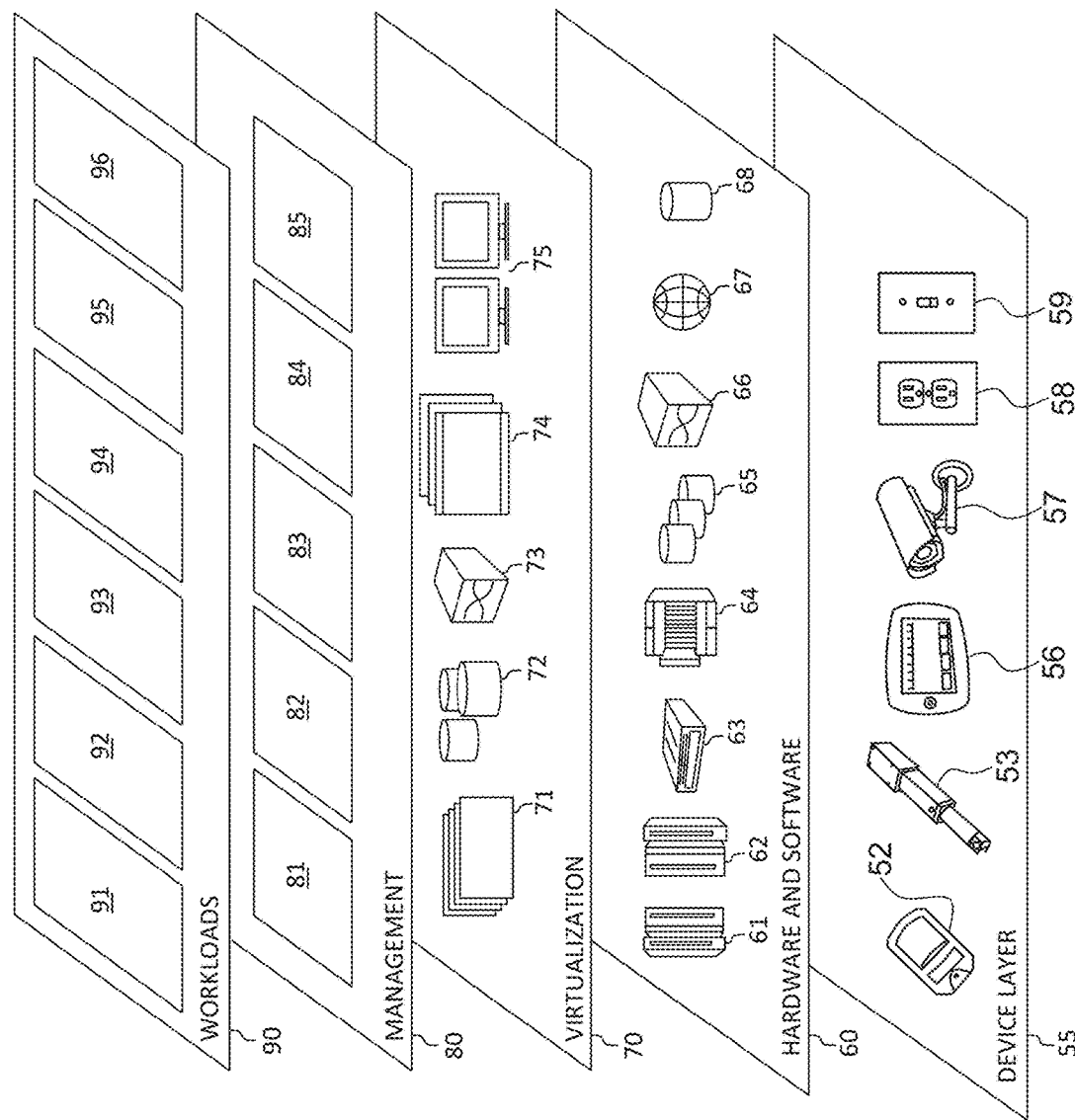
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing and managing an AaaS. In addition, the workloads and functions 96 for providing and managing the AaaS may include such operations as data analysis, regulatory compliance analysis, identity and security management, and/or data analytics functions. One of ordinary skill in the art will appreciate that the workloads and functions 96 for providing and managing the AaaS may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
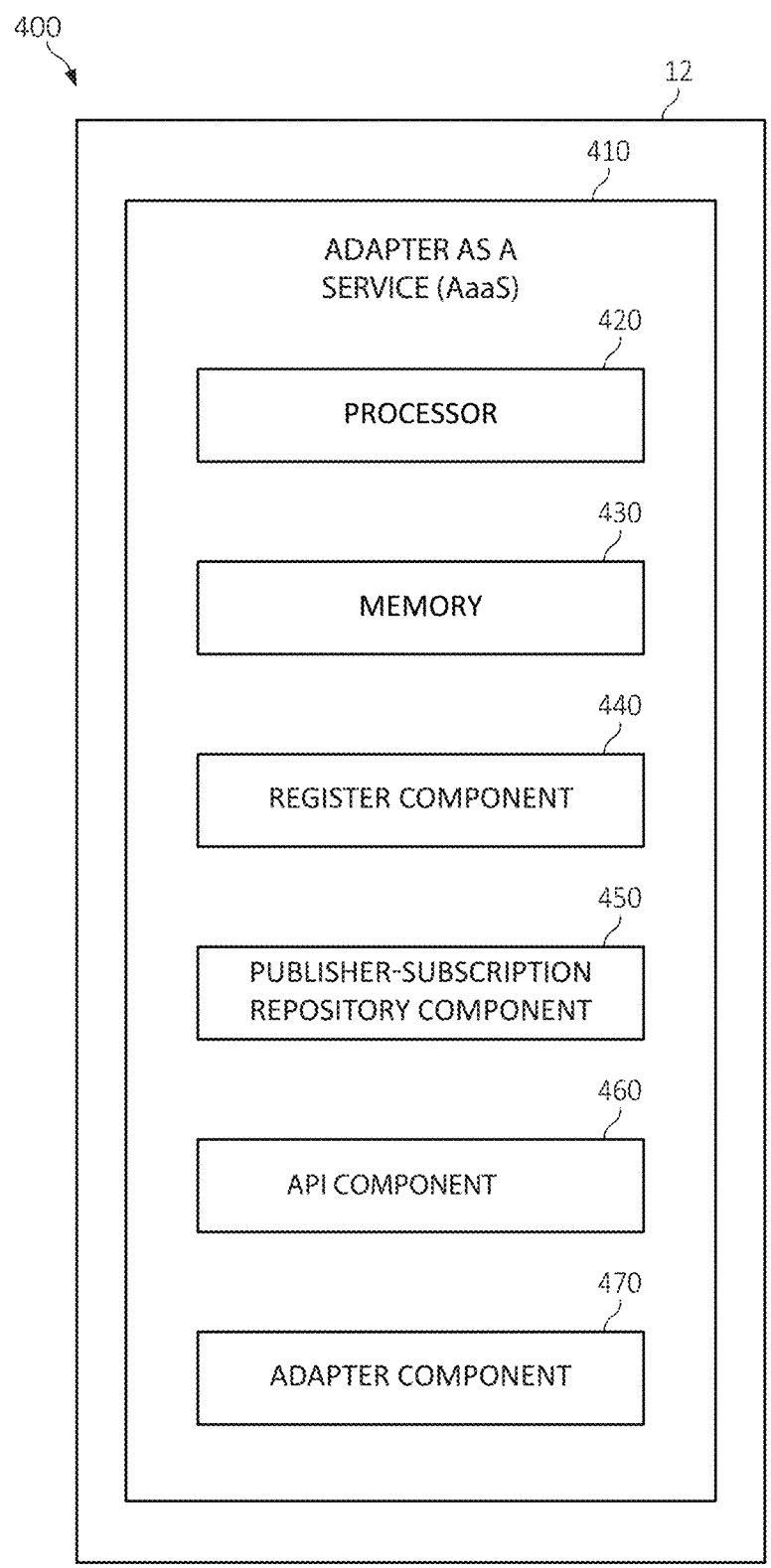
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. An Adapter as a Service ("AaaS") 410 is shown, incorporating processing unit 420 ("processor") to perform various computational, data processing and other functionality in accordance with various aspects of the present invention. In one aspect, the processor 420 and memory 430 may be internal and/or external to the AaaS 410, and internal and/or external to the computing system/server 12. The AaaS 410 may be included in computer system/server 12, as described in FIG. 1.

The processing unit 420 may be in communication with the memory 430. The AaaS 410 may include a register component 440, a publisher-subscription repository component 450, an application programming interface ("API") component 460, and an adapter (or connector) component 470.

As one of ordinary skill in the art will appreciate, the depiction of the various functional units in AaaS 410 is for purposes of illustration, as the functional units may be located within the AaaS 410 or elsewhere within and/or between distributed computing components.

In operation, the register component 440 may register each of the various types of adapters provided by the one or more providers with the AaaS. The register component 440 may approve and publish each of the types of adapters provided by each of the providers with the AaaS 410 in the publisher-subscription repository component 450 (which may function as a database or "registry").

The publisher-subscription repository component 450 may enable each users to search a list of each of the types of adapters registered with the AaaS 410. The publisher-subscription repository component 450 may subscribe the one or more users to a configuration of one of the various types of adapters registered with the AaaS 410.

The adapter component 470, in association with the API component 460, may provide accesses to one or more identity and access management (IAM) systems via the AaaS 410 functioning as an exchange service between one or more users and one or more providers of adapters registered in the publisher-subscription repository 450. Each of adapters in the AaaS 410 may enable provisioning and de-provisioning to one or more of the IAM systems.

The adapter component 470, in association with the API component 460, may switch the one or more users from a registration to a configuration of one of the plurality of types of adapters registered with the AaaS provided by a first provider to an alternative configuration of an alternative of the plurality of types of adapters registered with the AaaS provided by an alternative provider.

The adapter component 470, in association with the API component 460, may link the one or more users with one of the types of adapters registered with the AaaS. In one aspect, the various types of adapters may serve as a gateway for transactions, transactions exchanges, support, access to an application, or a combination thereof with one or more applications associated with the plurality of IAM systems.

Figure 5:
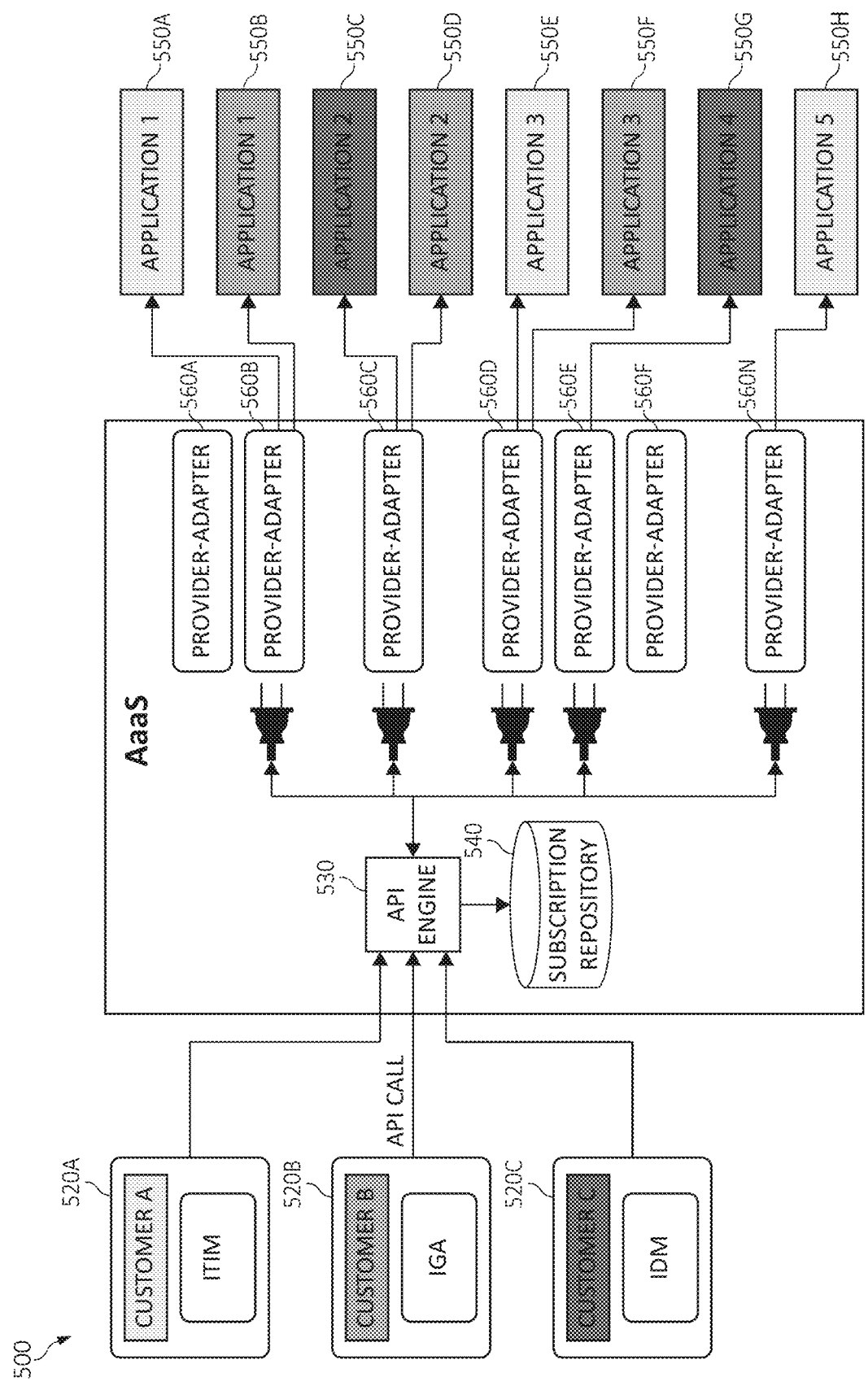
FIG. 5 is an additional block diagram depicting providing and managing an adapter as a service (AaaS) brokering service in accordance with aspects of the present invention.

Turning now to FIG. 5, a block diagram depicting exemplary functional components 400 for providing and managing an adapter as a service (AaaS) brokering service. In one aspect, one or more of the components, modules, services, applications, and/or functions described in FIGS. 1-5 may be used in FIG. 6. Repetitive description of like elements employed in other embodiments described herein (e.g., FIGS. 1-5) is omitted for sake of brevity.

As illustrated, the Adapter as a Service ("AaaS") 510 (e.g., see also the AaaS 410 of FIG. 5) is shown, incorporating one or more registered adapters 560 (e.g., connectors) such as, for example, provider-adapters 560A-N. The provider-adapters 560A-N each have been registered with the AaaS 510 and published in the subscription repository 540. The provider-adapters 560A-N may be provider/vendor specific to enable one or more users/customers 520 such as, for example, customers 520A-520C (e.g., identity manager "ITIM" customer 520A, IGA customer 520B, and/or IDM customer 520C) to connect and/or gain access to one or more computing applications 550 such as, for example, applications 550A-550H.

It should be noted that as used in FIG. 5, by way of example only, application 550A and 550B may be the same application (e.g., "application 1") and provided by the same source (e.g., an internet search engine), application 550C and 550D may be the same application (e.g., "application 2") provided by the same source, application 550E and 550F may be the same application (e.g., "application 3") provided by the same source.

Thus, in operation, the AaaS 510 provides a wide range of adapters 560 such as, for example, provider-adapters 560A-N that can provision and de-provision user accounts such as, for example, customers 520A-520C across different applications, servers and user repositories upon receiving one or more API calls to an API engine 530, which may be associated with the subscription repository 540 and each adapter 560 such as, for example, provider-adapters 560A-N.

In one aspect, each customer 520A-520 may subscribe to the AaaS 510 and select the applications 550 (or services) such as, for example, applications 550A-550H based on a particular requirement. For example, customer 520A ("customer A") may have an IAM platform that requires an adapter to application 550A-B (application 1), 550E-F (e.g., application 3), and 550H (e.g., application 5). More specifically, since there are multiple providers vendors offering different adapters to the same applications, the AaaS 510 may enable the customer (e.g., customer 520A) to select one or more of the registered adapters. Thus, as depicted, the AaaS 510 may act as a broker service and configure the provider-adapters 560A and/or B, 560D, and/or 560N for customer 520A ("customer A") to gain access to applications 550A (e.g., application 1), 550E (e.g., application 3), and 550H (e.g., application 5).

Alternatively, customer 520B ("customer B") requires adapter to applications 550A-B (e.g., application 1), 550C-D (e.g., application 2), and 550E-F (e.g., application 3). More specifically, since there are multiple providers vendors offering different adapters to the same applications, the AaaS 510 may enable the customer (e.g., customer 520B) to select one or more of the registered adapters. Thus, as depicted, the AaaS 510 may act as a broker service and configure provider-adapters 560A and/or B, 560C, and/or 560D for customer 520B to gain access to applications 550A-B (e.g., application 1), 550C-D (e.g., application 2), and 550E-F (e.g., application 3).

In an additional aspect, customer 520C ("customer C") requires an adapter to applications 550C and/or D and applications 550G. More specifically, since there are multiple providers vendors offering different adapters to the same applications, the AaaS 510 may enable the customer (e.g., customer 520C) to select one or more of the registered adapters. Thus, as depicted, the AaaS 510 may act as a broker service and configure provider-adapters 560C and 560E for customer 520C ("customer C") to gain access to applications 550C-D (e.g., application 2) and applications 550G (e.g., application 4).

However, when another provider/vender develops, enhances, registers, and/or publishes an alternative, and perhaps more robust adapter for one or more of the applications, the AaaS 510 may enable one or more of the customers 520A-520C to switch adapters without any additional down time and no additional customization. For example, assume application 550A is the same application as application 550B in FIG. 5. However, a first vendor provides their adapter (e.g., provider-adapter 560A) to connect to application 550A and an alternative vendor provides their adapter (e.g., provider-adapter 560B) to connect to application 550B (which is the same as application 550A). Thus, the AaaS 510 may act as a broker service and switch configurations from provider-adapters 560A (connected to application 550A) to provider-adapter 560B (connected to application 550B) for providing uninterrupted access/connectivity with a particular application. Thus, the customers can switch IAM platforms with very minimal effort using the underlying service.

Figure 6:
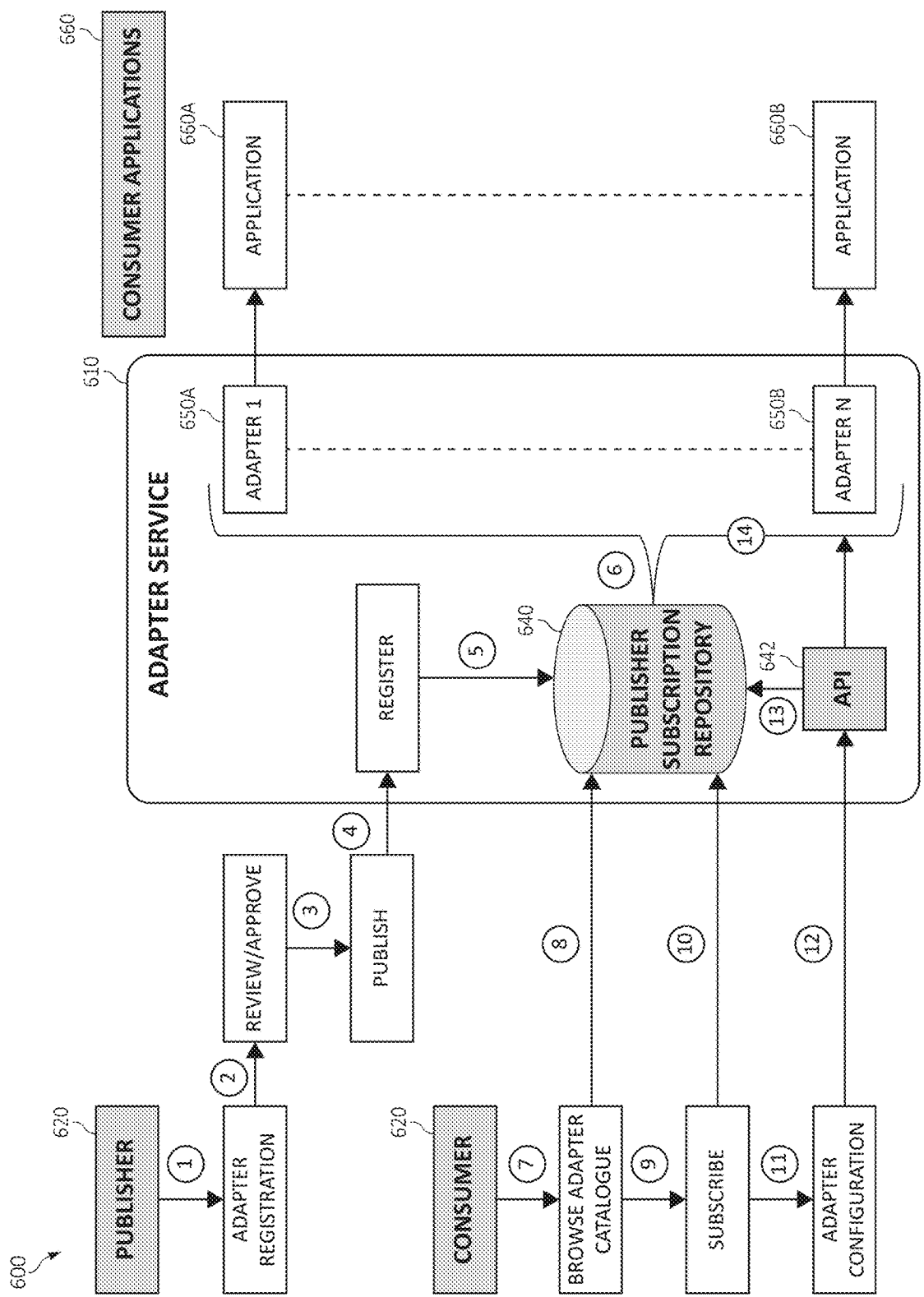
FIG. 6 a block flow diagram depicting an exemplary functionality for providing and managing an adapter as a service (AaaS) brokering service in accordance with aspects of the present invention.

Turning now to FIG. 6, block diagram of exemplary functionality 600 relating to providing and managing an adapter as a service ("AaaS") is depicted according to various aspects of the present invention. As shown, the various blocks of functionality are depicted with arrows designating the blocks' 600 relationships with each other and to show process flow or "actions steps" ("steps"). Additionally, descriptive information is also seen relating each of the functional blocks 500. As will be seen, many of the functional blocks may also be considered "modules" of functionality, in the same descriptive sense as has been previously described in FIG. 1-5. In one aspect, one or more of the components, modules, services, applications, and/or functions described in FIGS. 1-5 may be used in FIG. 6. Repetitive description of like elements employed in other embodiments described herein (e.g., FIGS. 1-5) is omitted for sake of brevity.

With the foregoing in mind, the module blocks 600 may also be incorporated into various hardware and software components of a system for image enhancement in accordance with the present invention. Many of the functional blocks 600 may execute as action steps and/or background processes on various components, either in distributed computing components, or on the user device, or elsewhere.

Starting in action step 1 (from a perspective of a provider/vendor of an adapter/connector), a publisher 620 (e.g., provider/vendor) may submit an adapter registration (e.g., a request to register an adapter/connector) with the AaaS 610. The AaaS 610 may review and approve (or reject) the registration application, as in action step 2. The AaaS 610 may publish the adapter provided by the publisher 620, as in block action step 3. The AaaS 610 may register and store the published adapter/connector with a publisher-subscription repository 640 (which may be included internally in (or externally to) the AaaS 610, as in block action steps 4 and 5.

Turning now to the perspective from a user/customer, a consumer 630 may access and browse/search a list of registered adapters (e.g., an adapter catalogue) provided by the publisher-subscription repository 640, as in action steps 7 and 8. The AaaS 610 may subscribe the consumer 630 with a configuration of one or more registered adapters such as, for example, adapter 1, 650A or adapter n, 650N, as in action steps 9 and 10. The AaaS 610 may configure one or more of the adapters (e.g., adapter 1, 650A or adapter n, 650N) for the subscribed consumer 630, as in action step 11. Using an API 642 of the AaaS 610, the consumer 630 may access the one or more of the adapters (e.g., adapter 1, 650A or adapter n, 650N) to gain access to one or more consumer applications 660 (e.g., consumer applications 660A or 660B), as in action steps 12 and 13. For example, the consumer 630, via the API 642, may gain access to application 660A using adapter 1, 650A and/or gain access to application 660B using adapter 1, 650B, as in action steps 6 and 14.

Figure 7:
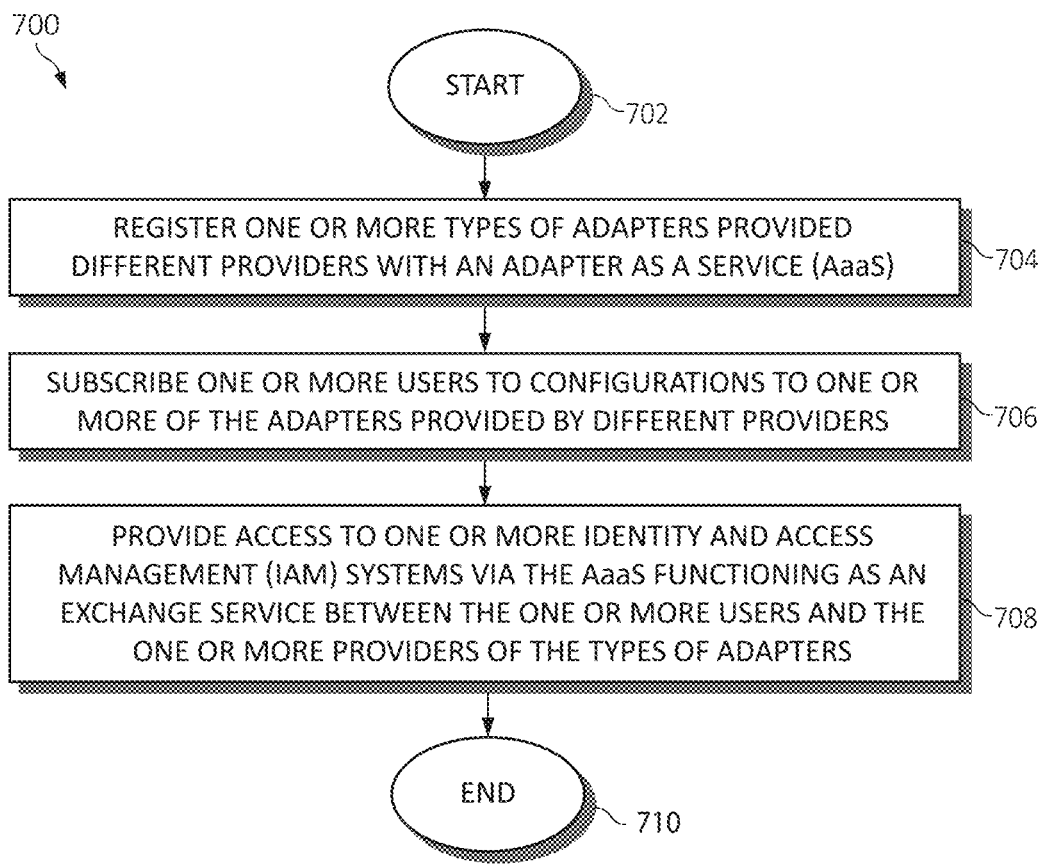
FIG. 7 is a flow chart diagram depicting an exemplary method for providing and managing an adapter as a service (AaaS) brokering service in a computing environment in accordance with aspects of the present invention.

Turning now to FIG. 7, a method 700 for providing and managing an adapter as a service (AaaS) in a computing environment is depicted. In one aspect, each of the devices, components, modules, operations, and/or functions described in FIGS. 1-6 also may apply or perform one or more operations or actions of FIG. 7. The functionality 700 may be implemented as a method executed as instructions on a machine, where the instructions are included on at least one computer readable medium or one non-transitory machine-readable storage medium. The functionality 700 may start in block 702.

One or more types of adapters provided different providers may be registered with the AaaS, as in block 704. One or more users may be subscribed to a configuration to one or more of the adapters provided by different providers, as in block 706. Access to one or more of a plurality of identity and access management (IAM) systems may be provided via an adapter as a service (AaaS) functioning as an exchange service between one or more users and one or more providers of a plurality of types of adapters, as in block 708. The plurality of types of adapters in the AaaS enable provisioning and de-provisioning to one or more of the plurality of IAM systems. The functionality 700 may end, as in block 710.

Also, one or more solutions may be provided for an IoT network, comprising one or more IoT devices, identified as having performance obligation deficiencies according to a knowledge domain describing performance obligations for the IoT network.

In one aspect, in conjunction with and/or as part of at least one block of FIG. 7, the operations of 700 may include each of the following. The operations of 700 may approve and publish each of the plurality of types of adapters provided by the one or more providers with the AaaS. The operations of 700 may enable the one or more users to search a list of each of the plurality of types of adapters registered with the AaaS. The operations of 700 may switch the one or more users from a registration to a configuration of one of the plurality of types of adapters registered with the AaaS provided by a first provider to an alternative configuration of an alternative of the plurality of types of adapters registered with the AaaS provided by an alternative provider. The operations of 700 may link, via the AaaS, the one or more users with one of the plurality of types of adapters registered with the AaaS. The various types of adapters may serve as a gateway for transactions, transactions exchanges, support, access to an application, or a combination thereof with one or more applications associated with the plurality of IAM systems.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for managing an adapter as a service (AaaS) in a computing environment, comprising:
registering a plurality of types of adapters provided by one or more providers with an adapter as a service (AaaS) entity, wherein the AaaS entity maintains the registered plurality of types of adapters and functions as an exchange between one or more users and the one or more providers to provide access to a plurality of identity and access management (IAM) systems;
responsive to registering the plurality of types of adapters with the AaaS entity, providing a browsable list of each of the plurality of types of adapters registered with the AaaS entity for selection by the one or more users; and
provisioning and de-provisioning, by respective adapters of the plurality of types of adapters on the browsable list, user accounts of the one or more users to one or more applications associated with the plurality of IAM systems, wherein the AaaS entity acts as a brokering service to perform the provisioning and de-provisioning by configuring the plurality of types of adapters on-demand as required by the one or more providers to access the one or more applications corresponding thereto.

2. The method of claim 1, further including approving and publishing, on the browsable list, each of the plurality of types of adapters provided by the one or more providers with the AaaS entity.

3. The method of claim 1, further including enabling the one or more users to search the browsable list of each of the plurality of types of adapters registered with the AaaS entity.

4. The method of claim 1, further including subscribing the one or more users to a configuration of one of the plurality of types of adapters registered with the AaaS entity.

5. The method of claim 1, further including switching the one or more users from a registration to a configuration of one of the plurality of types of adapters registered with the AaaS entity provided by a first provider to an alternative configuration of an alternative of the plurality of types of adapters registered with the AaaS entity provided by an alternative provider.

6. The method of claim 1, further including linking, via the AaaS entity, the one or more users with one of the plurality of types of adapters registered with the AaaS entity, wherein the one of the plurality of types of adapters serving as a gateway for transactions, transactions exchanges, support, access to an application, or a combination thereof with the one or more applications associated with the plurality of IAM systems.

7. A system for managing an adapter as a service (AaaS) in a computing environment, comprising:
one or more computers with executable instructions that when executed cause the system to:
register a plurality of types of adapters provided by one or more providers with an adapter as a service (AaaS) entity, wherein the AaaS entity maintains the registered plurality of types of adapters and functions as an exchange between one or more users and the one or more providers to provide access to a plurality of identity and access management (IAM) systems;
responsive to registering the plurality of types of adapters with the AaaS entity, provide a browsable list of each of the plurality of types of adapters registered with the AaaS entity for selection by the one or more users; and
provision and de-provision, by respective adapters of the plurality of types of adapters on the browsable list, user accounts of the one or more users to one or more applications associated with the plurality of IAM systems, wherein the AaaS entity acts as a brokering service to perform the provisioning and de-provisioning by configuring the plurality of types of adapters on-demand as required by the one or more providers to access the one or more applications corresponding thereto.

8. The system of claim 7, wherein the executable instructions approve and publish, on the browsable list, each of the plurality of types of adapters provided by the one or more providers with the AaaS entity.

9. The system of claim 7, wherein the executable instructions enable the one or more users to search the browsable list of each of the plurality of types of adapters registered with the AaaS entity.

10. The system of claim 7, wherein the executable instructions subscribe the one or more users to a configuration of one of the plurality of types of adapters registered with the AaaS entity.

11. The system of claim 7, wherein the executable instructions switch the one or more users from a registration to a configuration of one of the plurality of types of adapters registered with the AaaS entity provided by a first provider to an alternative configuration of an alternative of the plurality of types of adapters registered with the AaaS entity provided by an alternative provider.

12. The system of claim 7, wherein the executable instructions link, via the AaaS entity, the one or more users with one of the plurality of types of adapters registered with the AaaS entity, wherein the one of the plurality of types of adapters serving as a gateway for transactions, transactions exchanges, support, access to an application, or a combination thereof with the one or more applications associated with the plurality of IAM systems.

13. A computer program product for, by a processor, managing an adapter as a service (AaaS) in a computing environment, the computer program product comprising a non-transitory computer-readable storage medium having computer-readable program code portions stored therein, the computer-readable program code portions comprising:
an executable portion that registers a plurality of types of adapters provided by one or more providers with an adapter as a service (AaaS) entity, wherein the AaaS entity maintains the registered plurality of types of adapters and functions as an exchange between one or more users and the one or more providers to provide access to a plurality of identity and access management (IAM) systems;
an executable portion that, responsive to registering the plurality of types of adapters with the AaaS entity, provides a browsable list of each of the plurality of types of adapters registered with the AaaS entity for selection by the one or more users; and
an executable portion that provisions and de-provisions, by respective adapters of the plurality of types of adapters on the browsable list, user accounts of the one or more users to one or more applications associated with the plurality of IAM systems, wherein the AaaS entity acts as a brokering service to perform the provisioning and de-provisioning by configuring the plurality of types of adapters on-demand as required by the one or more providers to access the one or more applications corresponding thereto.

14. The computer program product of claim 13, further including an executable portion that approves and publishes, on the browsable list, each of the plurality of types of adapters provided by the one or more providers with the AaaS entity.

15. The computer program product of claim 13, further including an executable portion that enables the one or more users to search the browsable list of each of the plurality of types of adapters registered with the AaaS entity.

16. The computer program product of claim 13, further including an executable portion that:
subscribe the one or more users to a configuration of one of the plurality of types of adapters registered with the AaaS entity; and
switches the one or more users from a registration to the configuration of one of the plurality of types of adapters registered with the AaaS entity provided by a first provider to an alternative configuration of an alternative of the plurality of types of adapters registered with the AaaS entity provided by an alternative provider.

17. The computer program product of claim 13, further including an executable portion that links, via the AaaS entity, the one or more users with one of the plurality of types of adapters registered with the AaaS entity, wherein the one of the plurality of types of adapters serving as a gateway for transactions, transactions exchanges, support, access to an application, or a combination thereof with the one or more applications associated with the plurality of IAM systems.

* * * * *